Figure 1:
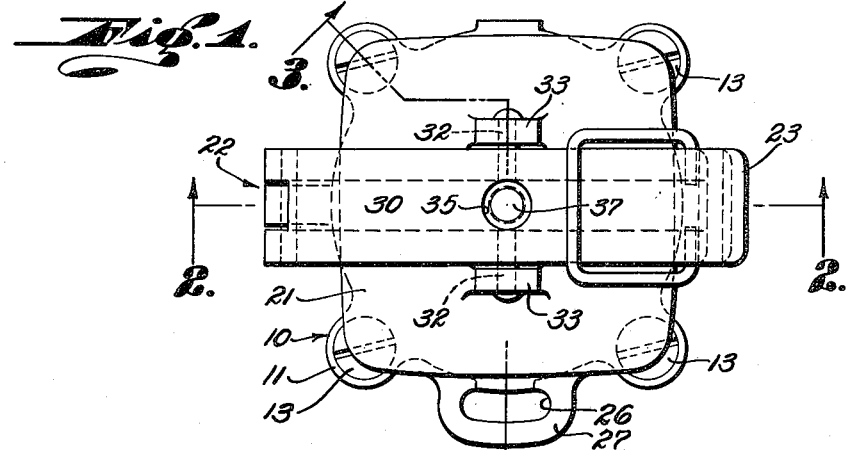

April 22, 1952 — L. K. WELLS ET AL — 2,593,712
FILLING FITTING

Filed Sept. 27, 1947 — 2 SHEETS—SHEET 1

LLOYD K. WELLS
STAPLES X. WILLARD
INVENTORS

BY _____
ATTORNEY

April 22, 1952 L. K. WELLS ET AL 2,593,712
FILLING FITTING
Filed Sept. 27, 1947 2 SHEETS—SHEET 2

LLOYD K. WELLS
STAPLES X. WILLARD
INVENTORS
BY Harbin White
ATTORNEY

Patented Apr. 22, 1952

2,593,712

UNITED STATES PATENT OFFICE 2,593,712

FILLING FITTING

Lloyd K. Wells and Staples X. Willard, Glendora, Calif., assignors to Petroleum Essentials, Inc., Los Angeles, Calif., a corporation of California Application September 27, 1947, Serial No. 776,608

4 Claims. (Cl. 220—86)

This invention has to do generally with tubular fittings for receiving and maintaining a fluid seal between one tubular section and a second section removably received in the other as during fluid transference. Particularly the invention is directed to improvements in tank fill caps adapted to receive a nozzle discharging fuel or other liquid into the tank. In this connection the invention has special merit as a fill cap for service station tanks filled from a hose nozzle.

Considering fuel tank fill caps as typical, heretofore the customary practice has been to insert the nozzle through a normally capped opening having clearance about the nozzle permitting displacement of at least a portion of the tank gases or vapors by the entering liquid, outwardly through the same opening. As a consequence, the liquid filling rate is materially reduced by interference of the entering liquid flow by the escaping vapors, and the vapors are released at locations where accidental ignition may occur.

One of our major objects is to provide an improved fill cap assembly having self-sealing characteristics with relation to a filling nozzle or like part, in that upon and by virtue of insertion of the nozzle into the cap body, a substantially fluid tight seal is effected about the nozzle to prevent the above described vapor escape and require all vapor displacement to occur through a separate tank vent. It is found that by so excluding vapor escape by way of the fill cap, it becomes possible to discharge fuel into the tank at a substantially increased rate.

More specifically, the invention contemplates a capped fitting capable of maintaining a fluid-tight seal against vapor escape from the tank in both opened and closed positions of the cap or cover, and particularly in a manner whereby in closed position, the cover seats against the sealing element which closes about the filling nozzle when the cover is open. As will later appear, a secondary seal may be provided between the cap and body structure to assure against fluid leakage through the closed cap.

The invention further provides a mounting for the cover in a manner permitting it self-accommodation or seating against the sealing element or elements. Specifically provided is a loose mounting for the cover whereby the latter is free to assume with relation to a seal gasket or ring, the position required for complete close-off.

Figure 2:
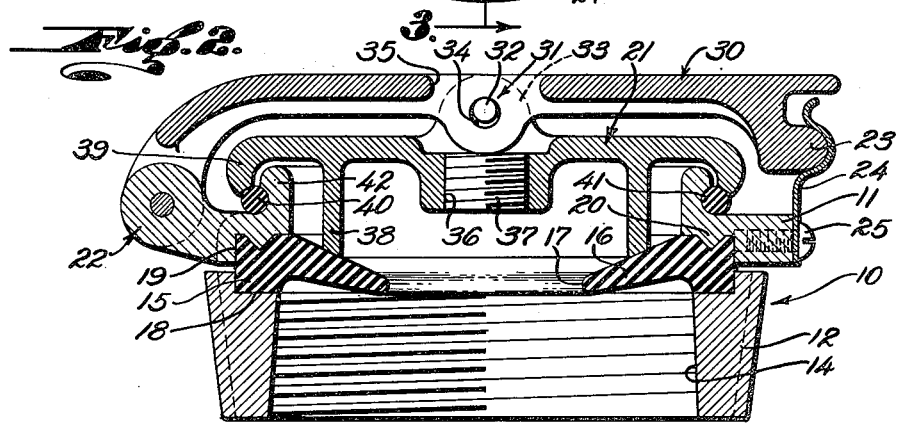
Figure 3:
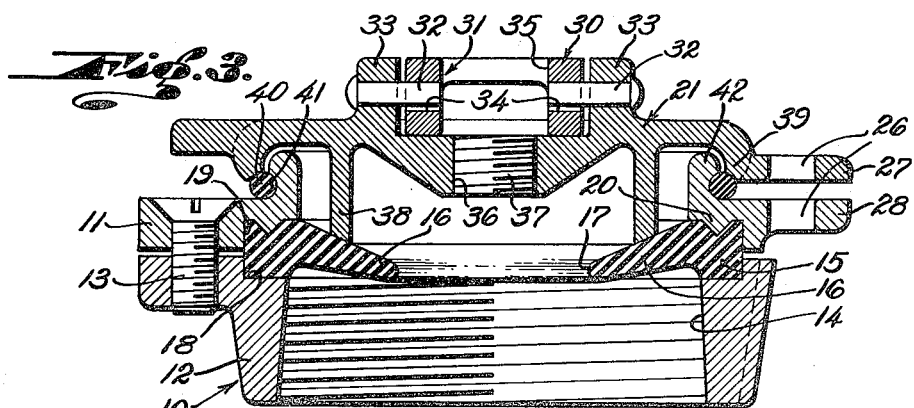
Figure 4:
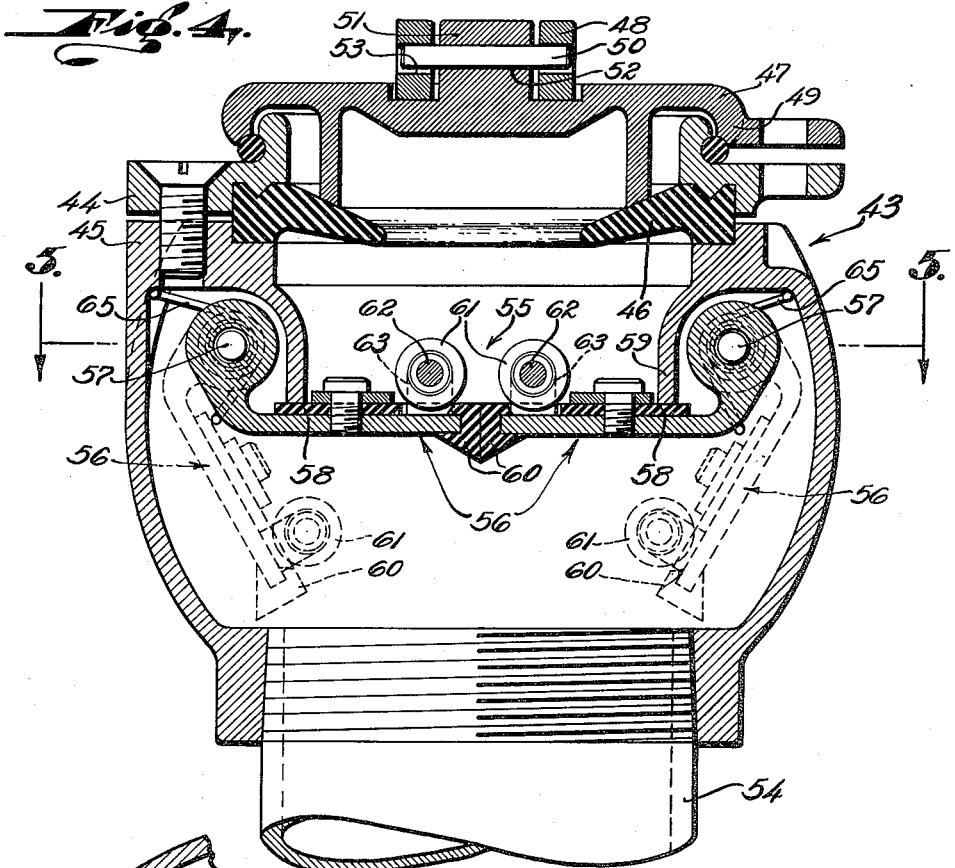
Figure 5:
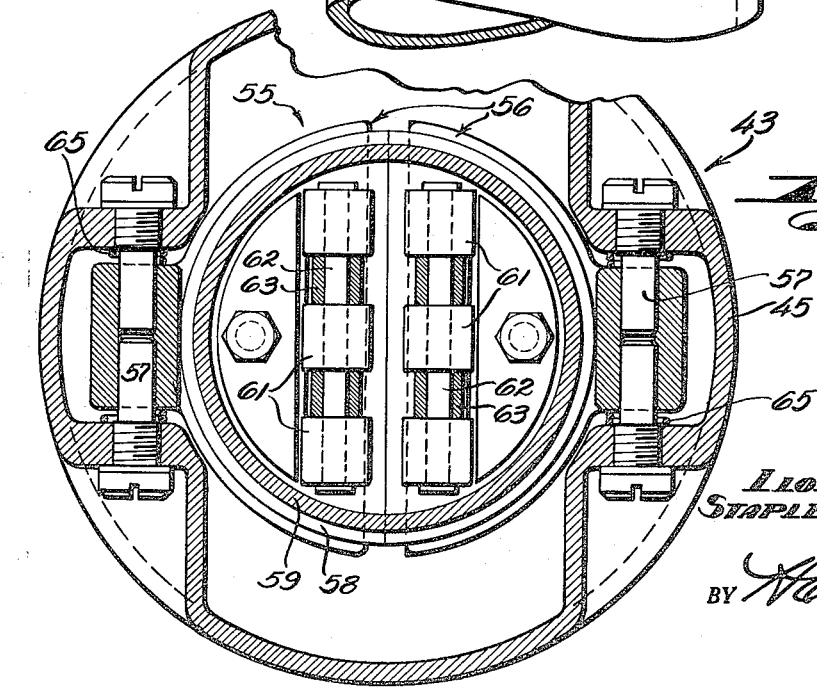

The invention contemplates various additional features and details such as the incorporation of a vapor seal check valve in the fill cap structure, as well as particular details of the body and cover structures adapting them for the stated purposes. All these will be understood to better advantage from the following detailed description of the accompanying drawings, in which:

Fig. 1 is a plan view showing one embodiment of the invention;

Figs. 2 and 3 are enlarged cross-section views on lines 2—2 and 3—3, respectively, of Fig. 1;

Fig. 4 is a view similar to Fig. 3 showing a variational form of the invention; and Fig. 5 is a cross-section on line 5—5 of Fig. 4.

Referring first to Figs. 1 to 3, the fill cap assembly comprises a body generally indicated at 10, and including upper and lower sections 11 and 12 fastened together by screws 13, the lower body section being internally threaded at 14 for application to a fuel tank inlet pipe. The body contains an annular gasket 15 having an inwardly extended lip 16, the internal diameter of which is smaller than the external diameter of the filling nozzle to be inserted therethrough. The lip 16 is radially extended to have free flexibility, and the gasket is made of rubber permitting considerable enlargement of its central opening 17 to accommodate nozzles of various sizes larger than the gasket opening. The gasket 15 is clamped between the body sections as by seating it within the annular recesses 18 and 19, the latter containing an annular projection 20 which seats or penetrates down into the gasket to radially and tightly confine it against being pulled inwardly as the lip 16 is deflected in receiving the nozzle.

The body normally is closed by a cover 21 carried by an arm 30 hinged at 22 to one side of the upper body section 11, the opposite end 23 of the arm being engageable within a latch spring 24 attached by screw 25 to the body, to releasably hold the cover assembly in closed position. The cover 21 may be secured against release from the body by a lock, not shown, passed through openings 26 in the vertically alined cover and body lugs 27 and 28, see Fig. 3. The cover is loosely and centrally carried by the arm 30 by an appropriate slack connection 31 which may consist of pins 32 terminating in the cover bosses 33 and extending with clearance through openings 34 in the arm. The bar 30 contains a central opening 35 vertically alined with a central opening 36 in the cover 21 and normally closed by plug 37. At such time as it may be desired to gauge the tank through the closed cover, plug 37 may be removed to pass a gauge rod through the filler cap structure.

The cover carries an integral depending tubular flange 38 which seats downwardly against the gasket 15 to normally maintain a fluid seal, it being apparent that the effect of vapor pressure in the tank is to press the gasket lip 16 against the cover flange and thereby tighten the seal in accordance with the magnitude of pressure. The cover has a second external depending flange 39 which seats against an annular seal ring 40 which preferably is an O ring type contained within recess 41 in the upstanding body portion 42.

Normally the cover assembly is closed against the body as illustrated in Figs. 2 and 3, with gasket lip 16 and the cover flange 38 engaged to maintain a primary vapor seal. A secondary seal is effected by the engagement of the cover flange 39 with ring 40. When the tank is to be filled, the cover assembly is swung open about the hinge 22 to permit insertion of a filling nozzle through the gasket opening 17. As previously mentioned, this opening normally will be smaller than the nozzle diameter so that a vapor seal is maintained about the nozzle by the tendency of the deformed gasket lip to press about the nozzle, and also by the tendency of any tank pressure to urge the gasket into sealing relation with the nozzle.

Figs. 4 and 5 illustrate a variational form of the invention similar to the previously described embodiment in that the body structure, generally indicated at 43 includes upper and lower sections 44 and 45 between which is clamped the sealing gasket 46 in the same manner and relationship stated above. As before, the cover 47 carried by bar 48 (corresponding to bar 30) engages and seals against gasket 46 and the secondary seal ring 49. In this instance a loose connection is effected between the arm 48 and cover by a pin 50 carried by the cover lug 51 received within an opening 52 in the arm, the pin ends being loosely received within the arm openings 53.

The lower body section 45, attached to the tank inlet pipe 54 contains a check valve assembly 55, preferably of the double wing type which is normally closed to prevent vapor escape from the tank, and which may be opened upon engagement by the filling nozzle to permit insertion of the latter past the valve. The check valve 55 is shown to comprise a pair of sections or wings 56 pivoted on pins 57 and carrying a gasket material 58 seating and sealing against the internal annular depending body flange 59. The inner edges of the wings 56 carry rubber strips 60 which, in the body of Fig. 4, interengage to complete the seal. Each wing carries a series of rollers 61 rotatable on a shaft 62 supported within bearings 63. Normally the wings are urged to the illustrated closed positions by coil springs 65 applied about the pins 57. When inserted through gasket 46 the nozzle end engages the rollers 61 and displaces the wing assemblies downwardly, as to the illustrated dotted line positions, which may permit continued projection of the nozzle into or through the bottom portion of the body.

We claim:

1. A fill cap assembly adapted to receive a removable tubular nozzle, comprising a body including a pair of sections, a sealing gasket clamped between said sections within the body and having an inwardly projecting annular lip adapted to receive the nozzle and to engage the outside thereof in substantially fluid tight relation, and a cap normally closing the body and having an annular axial flange projecting into the body in annularly spaced relation thereto to engage and form a seal with said gasket.

2. A fill cap assembly adapted to receive a removable tubular nozzle, comprising a body including a pair of sections, a sealing gasket clamped between said sections within the body and having an inwardly projecting annular lip adapted to receive the nozzle and to engage the outside thereof in substantially fluid tight relation, a cap normally closing the body and having a portion annularly engaging said gasket to form a seal, and a seal ring interengaged by the cap and body in the closed position of the cap and positioned radially outwardly of said gasket engaging portion of the cap.

3. A fill cap assembly adapted to receive a removable tubular nozzle, comprising a body including upper and lower sections, a sealing gasket clamped between said sections within the body and having an annular lip adapted to receive the nozzle and to engage the outside thereof in substantially fluid tight relation, a cap carried by the body and having an annular axial flange projecting into the body in annularly spaced relation thereto to engage and form a seal with said gasket, and a seal ring interengaged by the cap and said upper section of the body in the closed position of the cap.

4. A fill cap assembly adapted to receive a removable tubular nozzle, comprising a body including upper and lower sections, a sealing gasket clamped between said sections within the body and having an annular lip adapted to receive the nozzle and to engage the outside thereof in substantially fluid tight relation, a cap carried by the body and having an annular axial flange projecting into the body in annularly spaced relation thereto to engage and form a seal with said gasket, a seal ring interengaged by the cap and said upper section of the body in the closed position of the cap and located radially outwardly of said flange.

LLOYD K. WELLS.
STAPLES X. WILLARD.

REFERENCES CITED

The following references are of record in the file of this patent:

UNITED STATES PATENTS

| Number | Name | Date |
|---|---|---|
| 1,605,577 | Bruen | Nov. 2, 1926 |
| 1,614,780 | Ehlers | Jan. 18, 1927 |
| 1,651,168 | Vickerman | Nov. 29, 1927 |
| 1,977,935 | Caldwell | Oct. 23, 1934 |
| 1,982,879 | Overbury | Dec. 4, 1934 |
| 2,154,545 | Thwaits | Apr. 18, 1939 |
| 2,159,178 | Rike et al. | May 23, 1939 |
| 2,276,907 | Sanford | Mar. 17, 1942 |
| 2,287,750 | Clayton | June 23, 1942 |
| 2,288,230 | Drane | June 30, 1942 |
| 2,465,095 | Harvey | Mar. 22, 1949 |